US010112333B2

(12) United States Patent
Thorn et al.

(10) Patent No.: US 10,112,333 B2
(45) Date of Patent: Oct. 30, 2018

(54) SANITARY EXTRUDER HOOD

(71) Applicant: SCHENCK PROCESS LLC, Kansas City, MO (US)

(72) Inventors: Jonathan O. Thorn, Kansas City, MO (US); Russell A. Heinen, Merriam, KS (US); John W. Scott, Olathe, KS (US)

(73) Assignee: Schenck Process LLC, Kansas City, MO (US)

(*) Notice: Subject to any disclaimer, the term of this patent is extended or adjusted under 35 U.S.C. 154(b) by 64 days.

(21) Appl. No.: 15/132,987

(22) Filed: Apr. 19, 2016

(65) Prior Publication Data
US 2016/0304295 A1 Oct. 20, 2016

Related U.S. Application Data

(60) Provisional application No. 62/149,919, filed on Apr. 20, 2015.

(51) Int. Cl.
B65G 53/18 (2006.01)
B29C 47/00 (2006.01)
(Continued)

(52) U.S. Cl.
CPC .......... B29C 47/0009 (2013.01); A23P 30/20 (2016.08); B29C 47/0011 (2013.01);
(Continued)

(58) Field of Classification Search
CPC ........ B65G 53/16; B65G 53/18; B65G 53/22; B65G 53/38; B65D 88/70; B65D 88/703; B65D 88/706; B65D 88/72
(Continued)

(56) References Cited

U.S. PATENT DOCUMENTS 2,530,689 A * 11/1950 Egger .................. B05B 7/1404
406/144
2,707,132 A * 4/1955 Baresch ................ B65G 53/12
406/132
(Continued)

FOREIGN PATENT DOCUMENTS

DE 102009015578 10/2010

OTHER PUBLICATIONS

European Search Report for Application No. 16000890, dated Aug. 16, 2016, 10 pages.
(Continued)

Primary Examiner — Joseph A Dillon, Jr.
(74) Attorney, Agent, or Firm — Hovey Williams LLP

(57) ABSTRACT

An extruder hood configured to operate in a steady-state configuration and a non-steady-state configuration. The extruder hood comprises an air inlet, an extruder hood outlet, and an extruder discharge zone within an interior space of the extruder hood, with the extruder discharge zone configured to receive extruded material. In the steady-state configuration, the extruder hood is configured to direct air received from the air inlet across the extruder discharge zone to cause extruded material to be ejected from the extruder hood via the extruder hood outlet. In the non-steady-state configuration, the extruder hood is configured to direct air received from the air inlet out of the extruder hood via the extruder outlet without being directed across the extruder discharge zone.

15 Claims, 13 Drawing Sheets

(51) Int. Cl.
    *B29C 47/34*    (2006.01)
    *A23P 30/20*    (2016.01)
    *B29B 9/06*     (2006.01)
    *B65G 53/06*    (2006.01)

(52) U.S. Cl.
    CPC .............. B29C 47/34 (2013.01); *B29B 9/06* (2013.01); *B29C 47/0066* (2013.01); *B65G 53/06* (2013.01)

(58) Field of Classification Search
    USPC .............. 406/128, 131, 136, 137, 138, 197; 222/195; 366/106
    See application file for complete search history.

(56) References Cited

U.S. PATENT DOCUMENTS

| | | | | |
|---|---|---|---|---|
| 2,734,782 A * | 2/1956 | Galle | ..................... | B65G 53/22 266/182 |
| 2,919,160 A * | 12/1959 | Blackburn | ............. | B65G 53/22 118/DIG. 5 |
| 3,149,884 A * | 9/1964 | Jones | ..................... | B65G 53/58 406/138 |
| 3,179,378 A * | 4/1965 | Zenz | ..................... | B65G 53/22 118/DIG. 5 |
| 3,294,675 A * | 12/1966 | Adams | ................... | B01J 8/0015 208/152 |
| 3,345,111 A * | 10/1967 | Bies | ..................... | B05B 7/1404 406/138 |
| 3,432,208 A * | 3/1969 | Draper | .................. | B65G 53/22 406/132 |
| 3,463,553 A * | 8/1969 | Toth | ........................... | B01J 8/18 406/138 |
| 3,583,681 A * | 6/1971 | Brown | ................... | B01F 5/245 366/107 |
| 3,619,011 A * | 11/1971 | Doble | ................... | B65G 53/22 406/129 |
| 3,964,793 A * | 6/1976 | Volpeliere | ............. | B65G 53/66 406/30 |
| 3,993,359 A * | 11/1976 | Sweeney | ................ | B65G 53/30 406/137 |
| 4,185,926 A * | 1/1980 | Lyon | ..................... | B01F 13/025 366/101 |
| 4,362,442 A * | 12/1982 | Bentzen-Bilkvist | ... | B65G 53/28 406/109 |
| 4,502,819 A * | 3/1985 | Fujii | ..................... | B65G 53/66 406/132 |
| 4,592,679 A * | 6/1986 | Boiting | .................. | B65G 53/66 406/127 |
| 4,662,799 A * | 5/1987 | Paul | ....................... | B65G 53/12 406/14 |
| 4,834,590 A * | 5/1989 | Schneider | .............. | B65G 53/12 406/136 |
| 4,907,892 A * | 3/1990 | Paul | .................... | B01F 13/0244 366/101 |
| 5,018,869 A * | 5/1991 | Paul | .................... | B01F 13/0244 366/101 |
| 5,071,289 A * | 12/1991 | Spivak | .................. | B65D 88/70 406/11 |
| 5,505,567 A | 4/1996 | Scott | | |
| 7,329,071 B2 * | 2/2008 | Sonnichsen | ............ | B65G 53/18 406/144 |
| 8,337,122 B2 * | 12/2012 | Schultz | .................. | B65G 53/66 406/137 |
| 2006/0151053 A1 * | 7/2006 | Boroch | .................. | B65G 53/16 141/83 |
| 2008/0219779 A1 * | 9/2008 | Parkinson | .............. | B65G 53/22 406/137 |

OTHER PUBLICATIONS

"Energy Efficient Generation of Compressed Air and Vacuum for Pneumatic Conveying," published Sep. 18, 2014, http://prozesstechnik.industrie.de/allgemein/schonender-transport-von-kaffee/, originally accessed on Aug. 4, 2016, English translation accessed on Aug. 7, 2017, 6 pages.

* cited by examiner

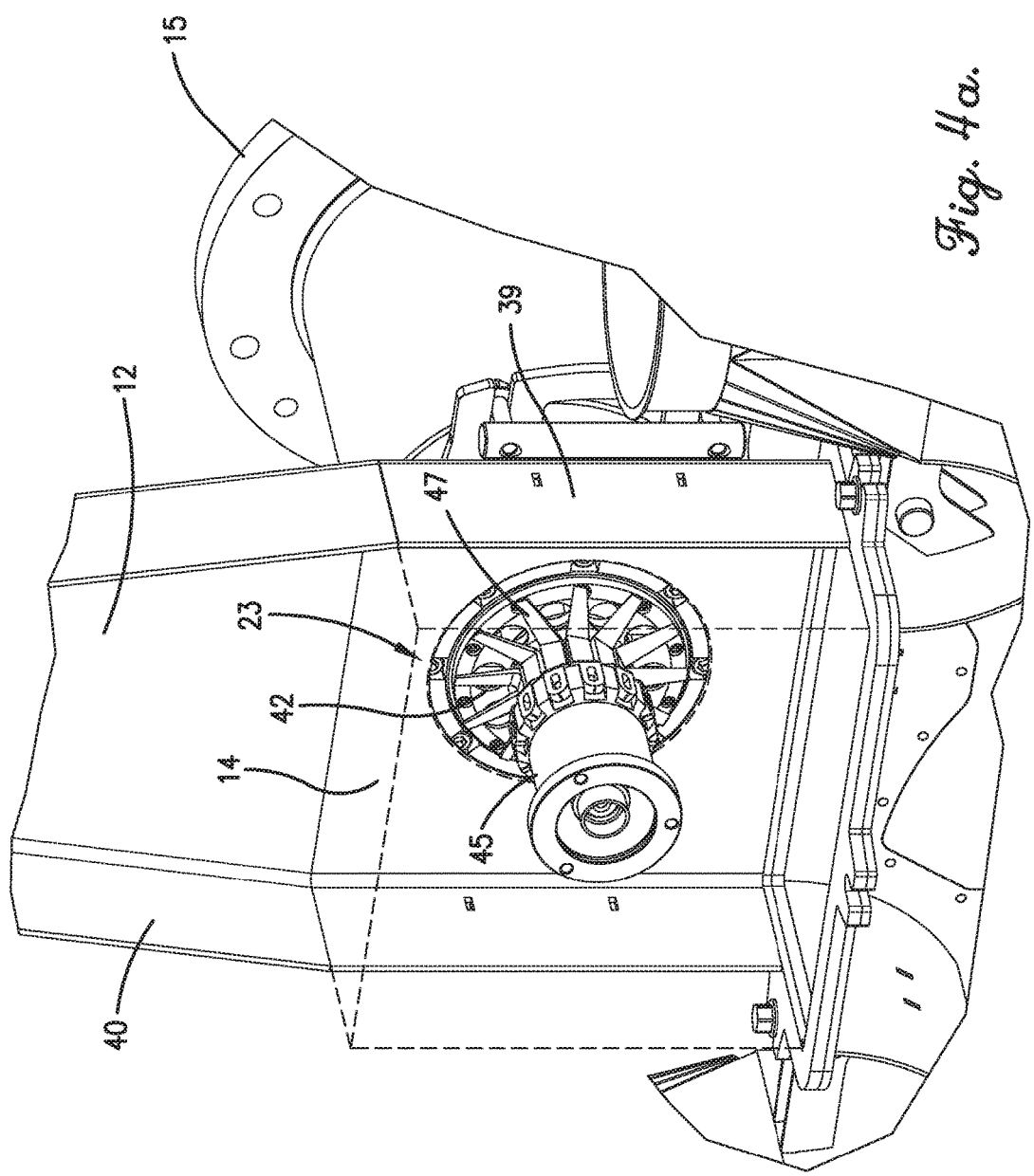

SANITARY EXTRUDER HOOD

CROSS-REFERENCE TO RELATED APPLICATION

This non-provisional patent application claims priority to U.S. Provisional Patent Application Ser. No. 62/149,919, filed on Apr. 20, 2015, entitled "SANITARY EXTRUDER HOOD," the entirety of which is incorporated by reference into the present non-provisional patent application.

BACKGROUND OF THE INVENTION

1. Field of the Invention

Embodiments of the present invention are directed to a sanitary extruder hood. In more detail, embodiments of the present invention are directed to an extruder hood for a pneumatic conveyance system, with the extruder hood configured to provide sanitary airflow across an extruder discharge zone such that material can be extruded and conveyed in a sanitary and efficient manner.

2. Description of the Related Art

An extruder is a machine used in many industries for creating various products from raw material. In general, an extruder machine utilizes heat and pressure to change the nature, shape, and/or condition of a material so as to produce a finalized product. For instance, in the human and pet food industries, wetted food materials can be extruded to create food products. The wetted food materials may be extruded through dies to form food products having various sizes, shapes, and/or cross-sections.

Extruder machines can be associated with a spinning knife that cuts and ejects the newly-formed food products from the extruder machine. In certain instances, an extruder hood can be positioned around a discharge of the extruder machine so as to receive the extruded food products. Some extruder hoods can be associated with pneumatic systems, which use air to pneumatically remove the extruded food products and to transport the products for further processing, such as drying. In previously-used extruder hoods, the extruder hoods were configured to draw in ambient air and to use the ambient air to remove the extruded food products from the extruder. However, ambient air is often contaminated with particulates and biologicals that are undesirable in the food products. For example, biological contaminants at naturally occurring levels in the ambient air can enter the moist warm food-products, thereby finding a hospitable environment for reproduction and further growth. In addition, many previously-used extruder hoods used a clamshell design, in which the extruder hood was split vertically or horizontally. Such clamshell designs introduced complexities that increased costs and that created difficulties when using and maintaining the extruder hoods and when connecting the extruder hoods with extruder machines.

SUMMARY

Embodiments of the present invention include an extruder hood configured to operate in a steady-state configuration and a non-steady-state configuration. The extruder hood comprises an air inlet, an extruder hood outlet, and an extruder discharge zone within an interior space of the extruder hood, with the extruder discharge zone configured to receive extruded material. In the steady-state configuration, the extruder hood is configured to direct air received from the air inlet across the extruder discharge zone to cause extruded material to be ejected from the extruder hood via the extruder hood outlet. In the non-steady-state configuration, the extruder hood is configured to direct air received from the air inlet out of the extruder hood via the extruder outlet without being directed across the extruder discharge zone.

Embodiments of the present invention additionally include a pneumatic conveyance system for pneumatically conveying extruded material. The system comprises a positive air-pressure source, an extruder hood for receiving extruded material, a storage component for storing extruded material received from the extruder hood, and a convey line fluidly connecting the extruder hood and the storage component, wherein the extruded material is transported from the extruder hood to the storage compartment via the convey line. A zero point of the pneumatic conveyance system is located along said convey line.

Embodiments of the present invention further include a method for operating an extruder hood. The method comprises the initial step of providing an extruder hood that includes an extruder discharge zone for receiving extruded material, an air inlet for receiving pressurized air, and an extruder hood outlet for removing air and extruded material from the extruder hood. The method additionally includes the step of configuring the extruder hood in a non-steady-state configuration, such that pressurized air received in the air inlet is immediately directed out of the extruder hood, via the extruder outlet, without being directed across the extruder discharge zone. The method further includes the step of transitioning the extruder hood to a steady-state configuration, such that the pressurized air received in the air inlet is directed across the extruder discharge zone to cause extruded material to be ejected from the extruder hood via the extruder hood outlet.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 4a is a perspective partial view of a portion of the interior components of the extruder hood from FIG. 4, particularly showing an extruder discharge zone in an interior space of the extruder hood;

Figure 1:
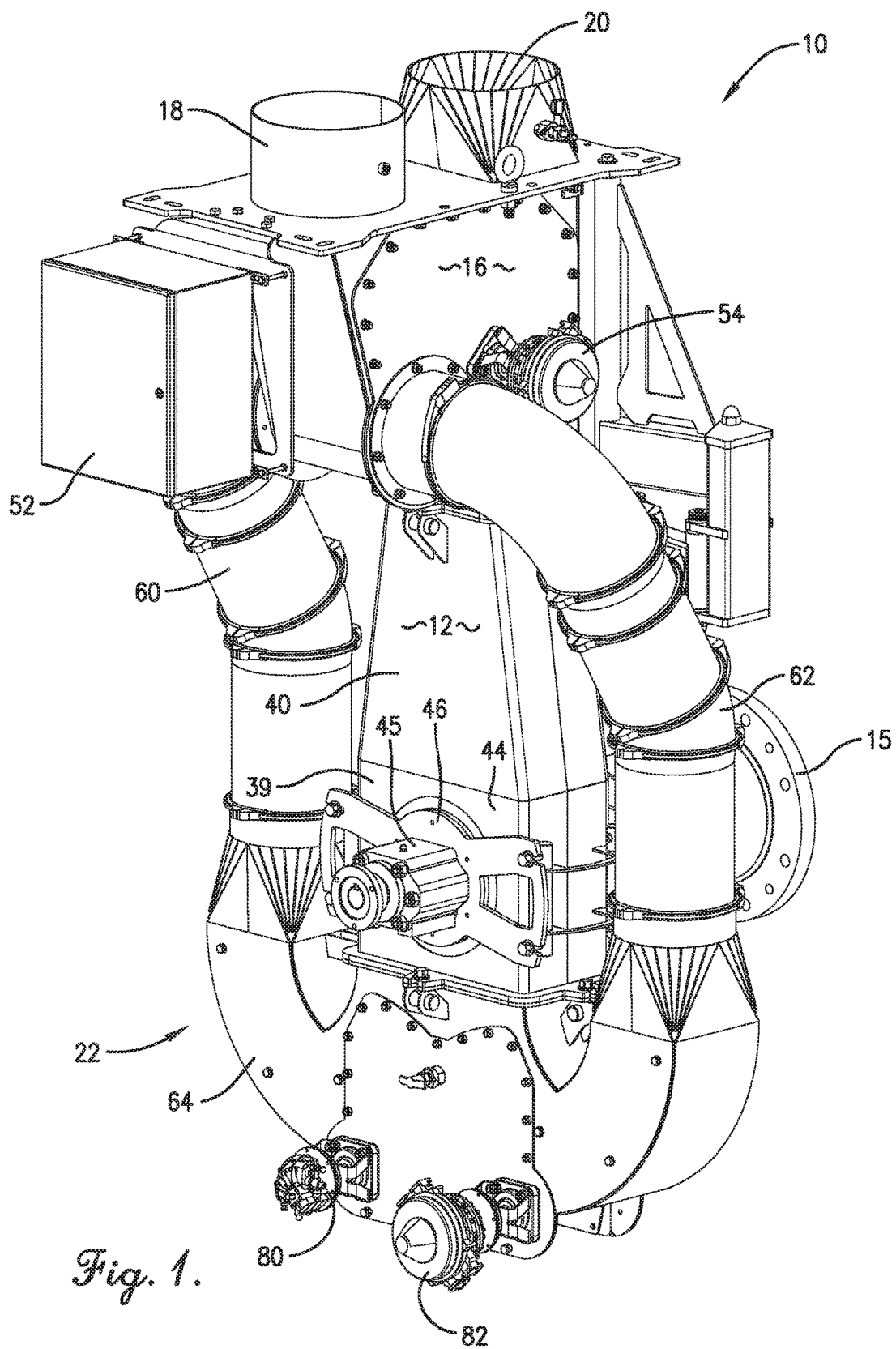
FIG. 1 is a front and side perspective view of an extruder hood according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

With reference to the drawings, and particularly FIGS. 1-4a, embodiments of the present invention include a sanitary extruder hood 10 comprising a main hood body 12 that encloses an interior space, with a portion of the interior space including an extruder discharge zone 14 (See, FIG. 4a) for receiving extruded material from an extruder machine 15. The extruder hood 10 additionally comprises a bypass damper 16 attached to an upper portion of the main hood body 12, with the bypass damper 16 including a primary air inlet 18 for receiving sanitary air and a primary outlet 20 for removing air and/or extruded materials. The extruder hood 10 further includes a distribution header 22 for connecting the bypass damper 16 to a lower portion of the main hood body 12, such that the distribution header 22 can direct sanitary air from the bypass damper 16 to the main hood body 12. As perhaps best shown by FIG. 4, the interior space of the main hood body 12 may include an opening 23 for fluidly connecting the main hood body 12 with the extruder machine 15. As such, the opening 23 functions as an inlet for extruded material provided by the extruder machine 15 to be received within the interior space of the extruder hood 10. It should be understood that the figures represent the extruder machine 15 as an extruder conduit, with remaining portions of the extruder machine 15 not being further illustrated. Regardless, the extruder machine 15 is configured to force extruded material through the extruder conduit, through the opening 23 that may be filled by a die set (described in more detail below), and into the extruder discharge zone 14 (See FIG. 4a), such that extruded material is received within the main hood body 12. Furthermore, the extruder hood 10 is configured to direct sanitary, conditioned airflow across the extruder discharge zone 14, such that the extruded material received in the extruder discharge zone 14 can be sanitarily and efficiently transported to a convey line (as described in more detail below) for removal and/or for further processing.

Figure 8:
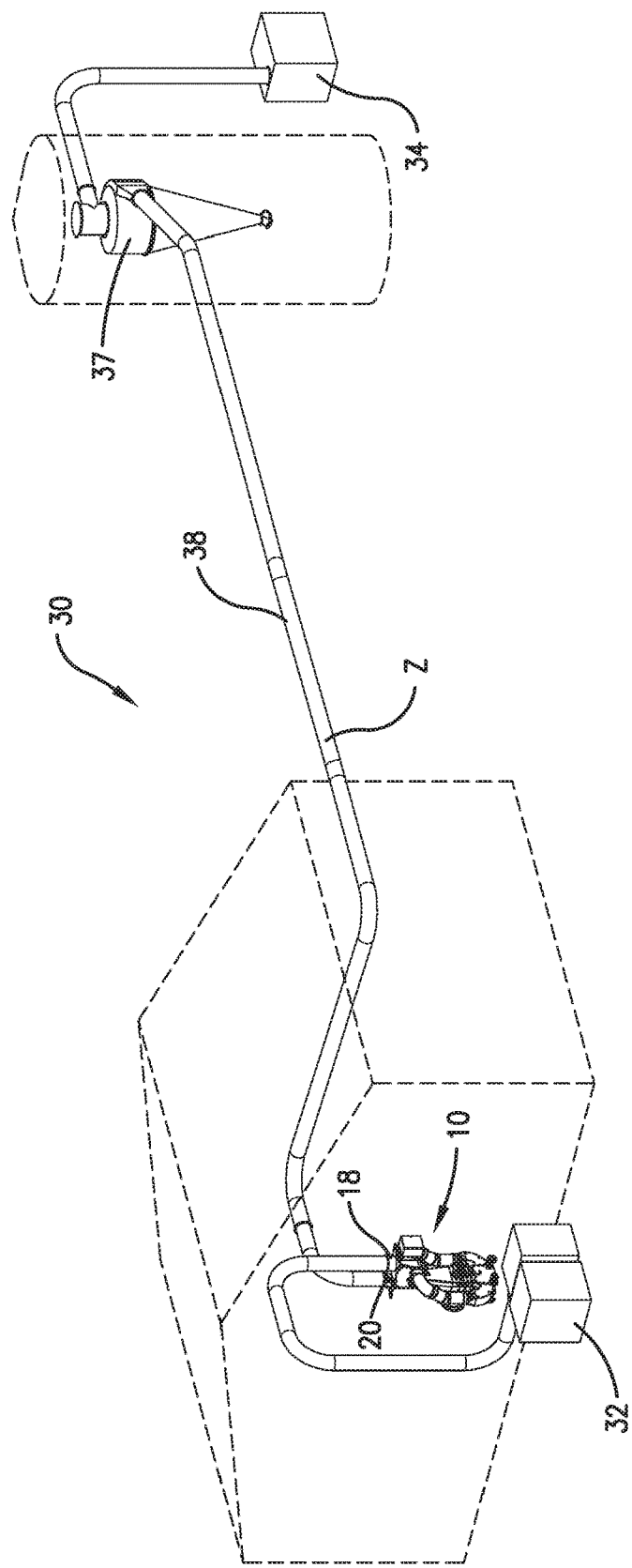
FIG. 8 is a schematic illustration of a pneumatic conveyance system according to embodiments of the present invention.

The extruder hood 10 of embodiments of the present invention may be used generally as part of a pneumatic conveyance system 30, as illustrated in FIG. 8, which facilitates the production and processing of the extruded material. In more detail, the pneumatic conveyance system 30 may comprise a sanitary blower 32 fluidly connected to the primary air inlet 18 of the extruder hood 10 via rigid or flexible conduits or ducts, such as pipes, tubing, hoses, or the like. In some embodiments, the conduits or ducts will be formed from aluminum, stainless steel, plastic, fabricated rubber, or the like. Embodiments of the present invention provide for the sanitary blower 32 to comprise any type of blower, air pump, fan, or other device capable of forcing conditioned air into the extruder hood 10. As such, the sanitary blower 32 is configured to generate a positive air-pressure for purposes of introducing air into the extruder hood 10. The sanitary blower 32 may include one or more components for conditioning the air that is introduced to the extruder hood. For instance, the sanitary blower 32 may include one or more high-efficiency particulate arrestance (HEPA) filters for removing particulate from the air. In some embodiments, the HEPA filter may be configured to remove at least 99.97% of airborne particles at least 0.3 micrometers in diameter. In some embodiments, the sanitary blower 32 may further comprise components necessary to control the temperature of the air, such as heating elements, refrigeration components, heat-exchangers, and/or combinations thereof. The sanitary blower 32 may further comprise components capable of controlling the humidity of the air, such as humidifiers and/or de-humidifiers. In still further embodiments, the sanitary blower 32 may comprise components capable of sanitizing the air introduced to the extruder hood 10, such as aerosol spraying mechanism, ultraviolet (UV) lights, or the like.

Remaining with FIG. 8, the pneumatic conveyance system may additionally comprise a negative air pump 34 fluidly connected to the primary outlet 20 of the extruder hood 10 via rigid or flexible conduits or ducts, such as pipes, tubing, hoses, or the like. In some embodiments, the conduits or ducts will be formed from aluminum, stainless steel, plastic, fabricated rubber, or the like. Embodiments of the present invention provide for the negative air pump 34 to comprise any type of air pump, vacuum pump, fan, or other device capable of generating a negative air-pressure. As such, the negative air pump 34 is configured to generate a negative air-pressure for removing air and/or extruded material from the extruder hood 10.

Between the negative air pump 34 and the extruder hood 10, the pneumatic conveyance system 30 may further comprise one or more components for separating, capturing, receiving, holding, and/or processing portions of the extruded material. For instance, a cyclone separator 37 may be used to capture and hold part or all of the extruded material removed from the extruder hood 10. In other embodiments, a horizontal material separator may be used in place of cyclone separator 37. Nevertheless, as shown in FIG. 8, the cyclone separator 37 may be integrated within the pneumatic conveyance system 30 between the extruder hood 10 and the negative air pump 34 via conduits or ducts. As used herein, the conduit or duct extending from the extruder hood 10 and the negative air pump 34 is defined as a convey line 38.

Figure 2:
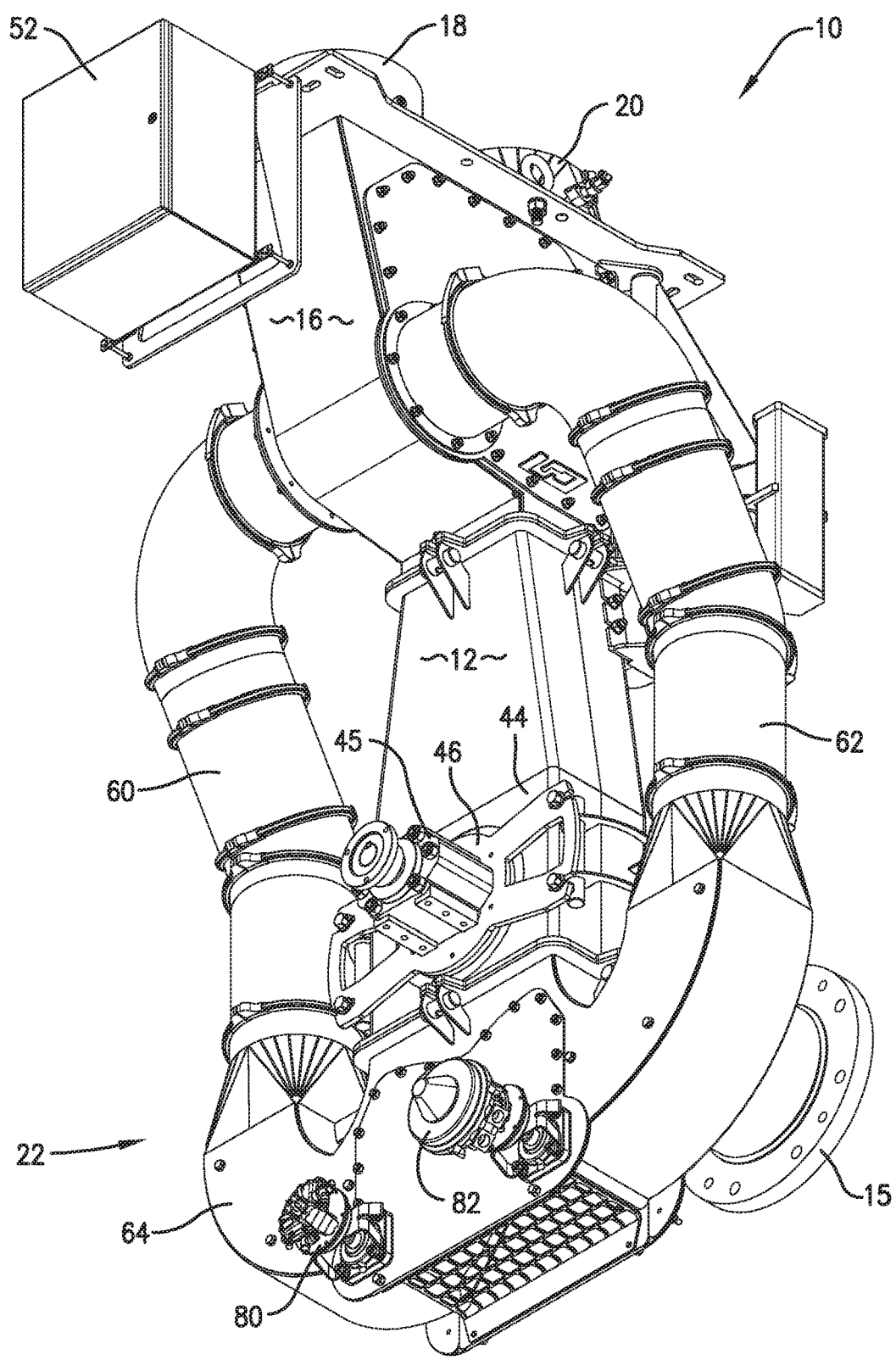
FIG. 2 is a front, side, and bottom perspective view of the extruder hood from FIG. 1.
Figure 3:
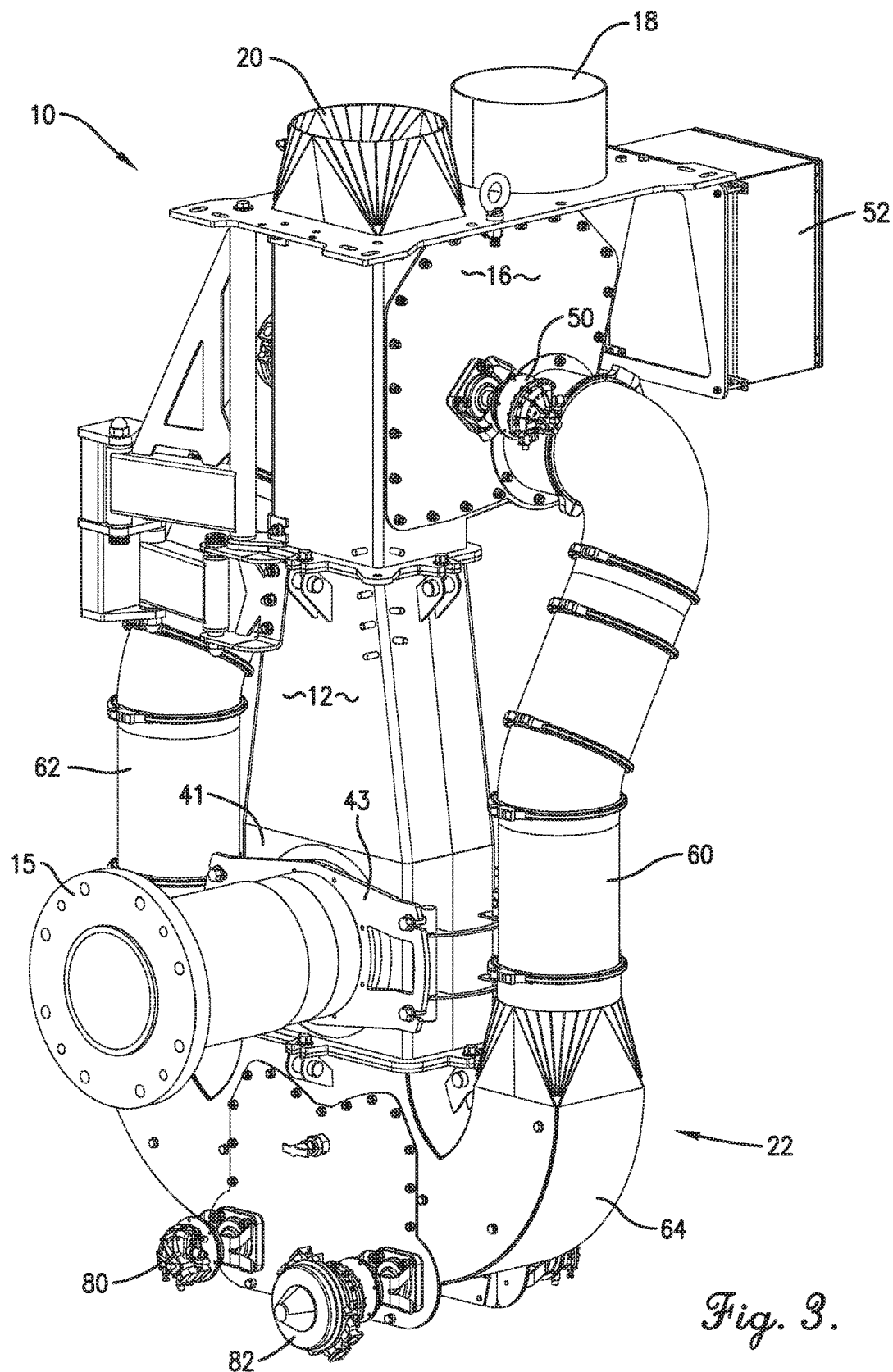
FIG. 3 is a rear and side perspective view of the extruder hood from FIGS. 1-2.
Figure 4:
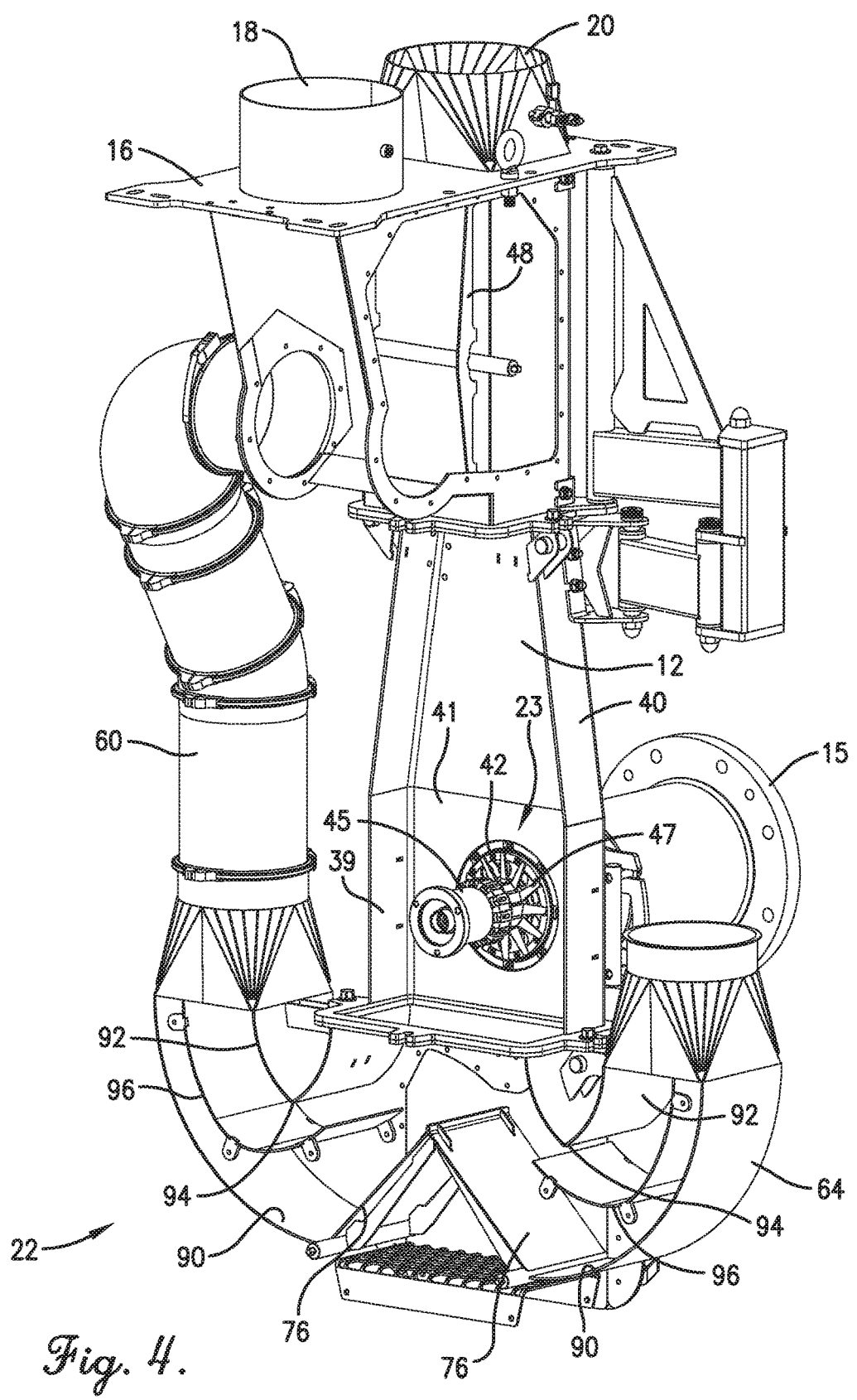
FIG. 4 is a perspective partial view of the extruder hood from FIGS. 1-3 in a steady-state configuration, with a portion of the front of the extruder hood being cut away to show interior components of the extruder hood.

Returning to the extruder hood 10, as illustrated by FIGS. 1-7, the main hood body 12 may comprise a generally rectangular housing structure enclosing an interior space. As shown in FIG. 4a, the interior space includes the extruder discharge zone 14, which is the portion of the main hood body 12 interior space that surrounds the opening 23. In more detail, as illustrated in FIGS. 1, 4, and 4a, the main hood body 12 may comprise a main section 39 formed as a 3-dimensional regular rectangle or a cube. Additionally, the main hood body 12 may comprise a tapered section 40 formed as a 3-dimensional tampered rectangle that extends from the main section 39 in a tapered manner to the bypass damper 16. As such, in some embodiments, the extruder discharge zone 14 (as illustrated in FIG. 4a) may be comprised of the portion of the interior space of the main hood body 12 that is enclosed by the main section 39 of the main hood body 12.

The main hood body 12 may be formed as a generally monolithic, one-piece structure. The main hood body 12 can be formed from aluminum, stainless steel, plastic, or other material with sufficient strength and durability to function in the pneumatic conveyance system 30 of embodiments of the present invention. With reference to FIGS. 4-7, a first major panel 41 of the main hood body 12 may include the opening 23 that fluidly connects the extruder machine 15 with the extruder discharge zone 14. The opening 23 may be configured to integrate with a die set 42, such that extruded material provided by the extruder machine 15 passes through the die set 42 on its way to the extruder discharge zone 14 within the main hood body 12. In some embodiments, as shown in FIG. 3, the extruder hood 10 may include a die adapter 43, which is configured to integrate the die set 42 and/or the extruder machine 15 with the main hood body 12. The die set 42 provides for wetted material to be extruded into the extruder hood 10 to form a particular size and shape of extruded material. Beneficially, as will be discussed in more detail below, the die adapter 43 can be used to integrate various types and sizes of die sets and extruder machines with the extruder hood 10. As described previously, the figures only illustrate the extruder conduit of the extruder machine 15. Nevertheless, it should be understood that the extruder machine contemplated for use with the extruder hood 10 of embodiments of the present invention may comprise any type of wet material extruder commonly used to extrude wetted food material, such as human and/or pet food.

Turning back to FIGS. 1-2, the main hood body 12 may additionally include a second major panel 44, which is opposite of the first major panel 41, and which may include an opening that is configured accept and/or otherwise integrate with a rotating cutting assembly 45. FIGS. 4-7 illustrate a portion of the cutting assembly 45 that is received within the interior space of the main hood body 12 via the opening through the second major panel 44. In some embodiments, as shown in FIGS. 1-2, the extruder hood 10 may include a cutter adapter 46, which is configured to integrate the cutting assembly 45 with the main hood body 12. Beneficially, the cutter adapter 46 can be used to integrate various types and sizes of cutting assemblies 45 with the extruder hood 10. For example, as shown in FIGS. 4-7, the cutting assembly 45 may include a plurality of blades 47 configured to rotate about the die set 42 and through the extruder discharge zone 14. The rotating cutting assembly 45 may be caused to rotate by a motor (not shown), such as an electric motor, a pneumatic, or a combustion motor. In operation, wetted material is extruded through the die 42 so as to create an extruded material of a specific size and shape. As the cutting assembly 45 rotates, the blades 47 cut and eject the extruded material into the extruder discharge zone 14. To further facilitate the removal of the extruded material from the main hood body 12 for additional processing (e.g., drying), embodiments of the present invention include additional components that facilitate the efficient application of conditioned airflows across the extruder discharge zone 14, as will be described in more detail below.

With reference to FIGS. 1-7, the extruder hood 10 includes the bypass damper 16, which broadly comprising a housing defining an interior space. In some embodiments, the bypass damper 16 can be formed from aluminum, stainless steel, plastic, or other material with sufficient strength and durability to function in the pneumatic conveyance system 30 of embodiments of the present invention. In some embodiments, the bypass damper 16 may be secured to the upper portion of the main hood body 12, such that an interior space of the bypass damper 16 is fluidly connected with the interior space of the main hood body 12. The bypass damper 16 may be secured to the main hood body 12 by various forms of attachment, such as by flanged portions of each of the bypass damper 16 and the main hood body 12 being secured together via threaded fasteners, as shown in the drawings. In some embodiments, gaskets may not be required to facilitate the connection between the bypass damper 16 and the main hood body 12. The interior space of the bypass damper 16 may also be fluidly connected to the sanitary blower 32 and the convey line 38 via the primary air inlet 18 and the primary outlet 20, respectively. As previously described, the primary air inlet 18 receives conditioned air from the sanitary blower 32, while the primary outlet 20 directs air and/or extruded material to be removed from the extruder hood 10 into the convey line 38 for further processing.

Figure 5:
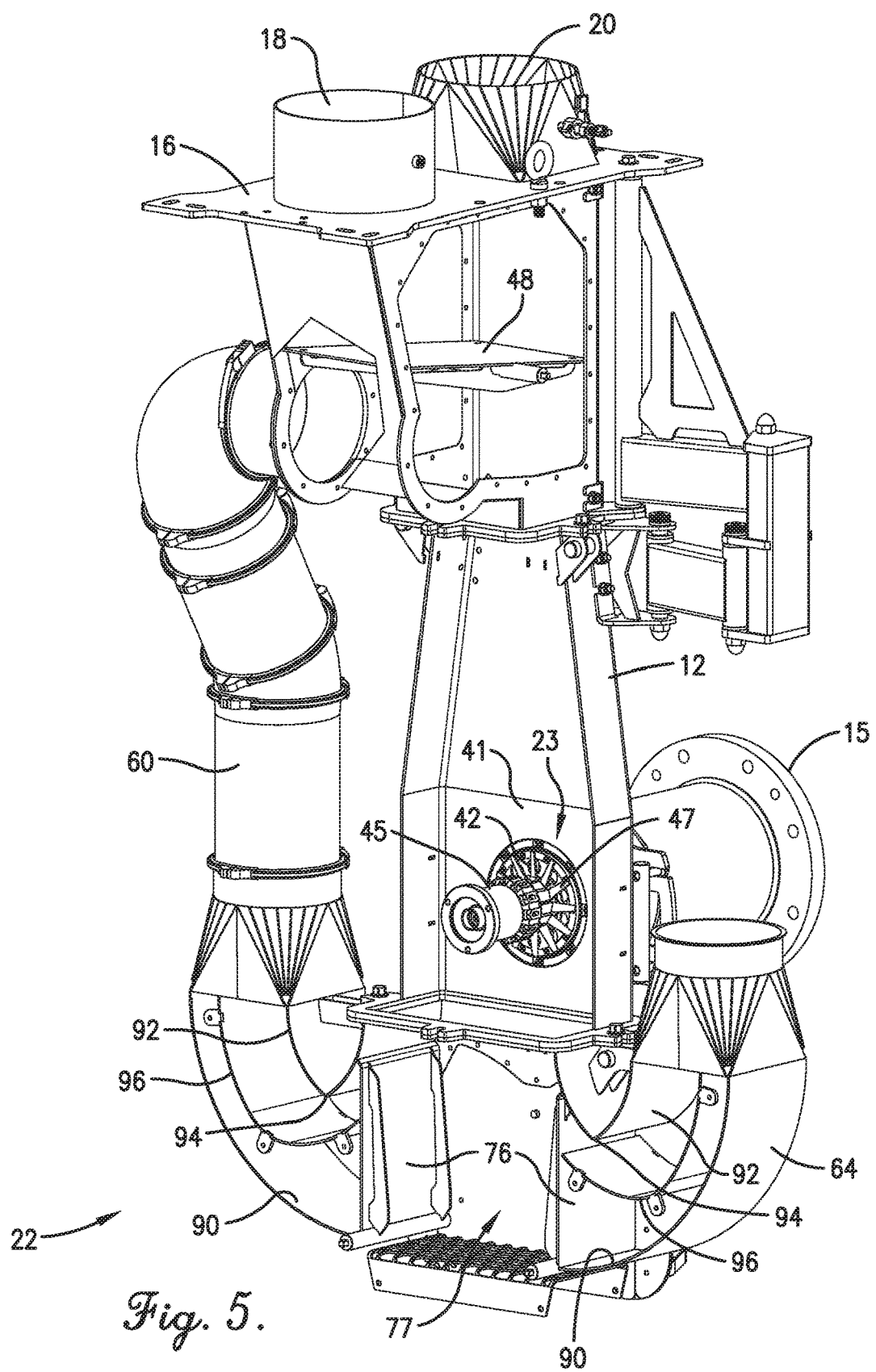
FIG. 5 is a perspective partial view of the extruder hood from FIG. 4 in a non-steady-state configuration.
Figure 9:
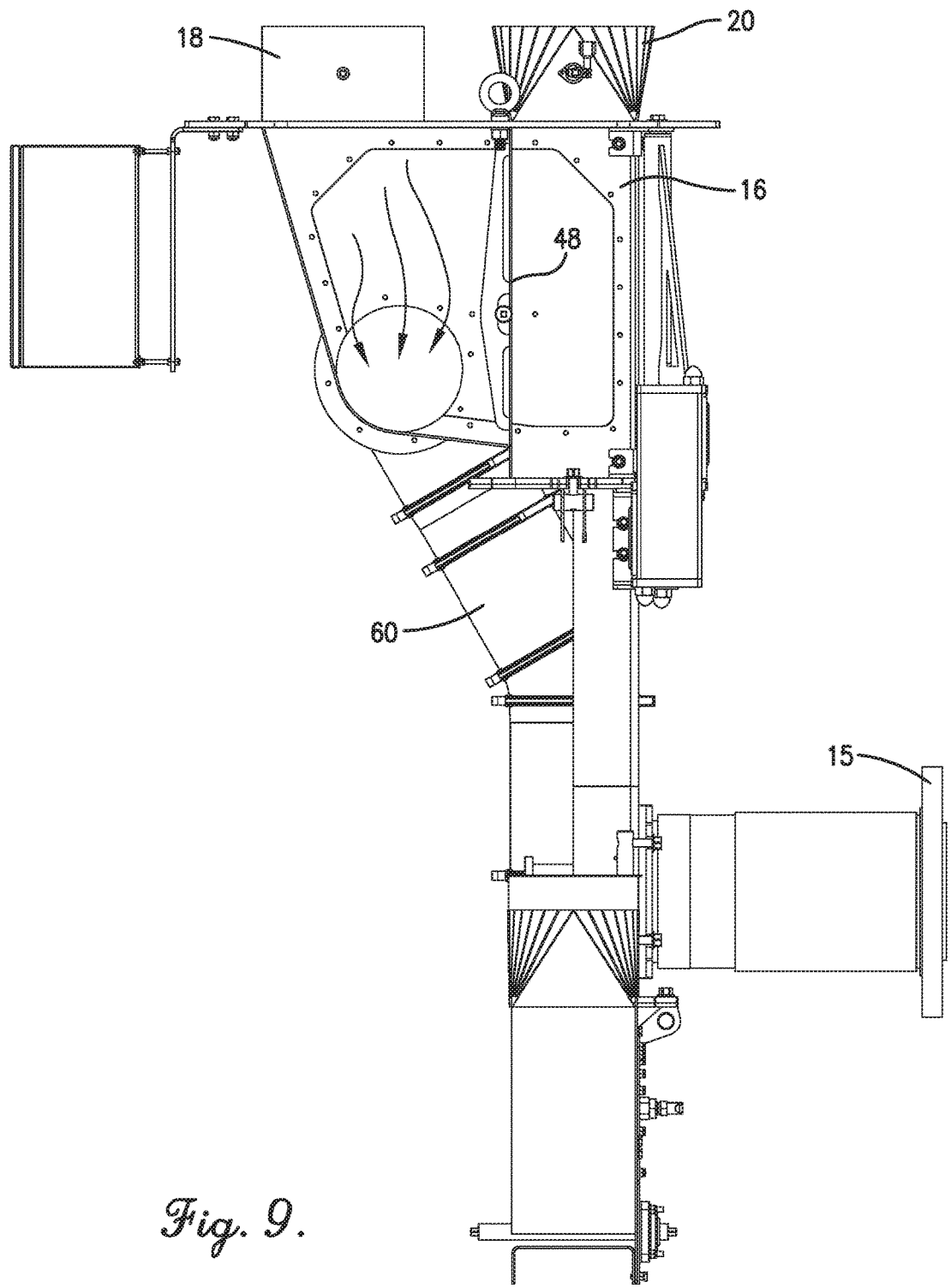
FIG. 9 is a side elevation partial view of the extruder hood from FIG. 4 in the steady-state configuration.
Figure 10:
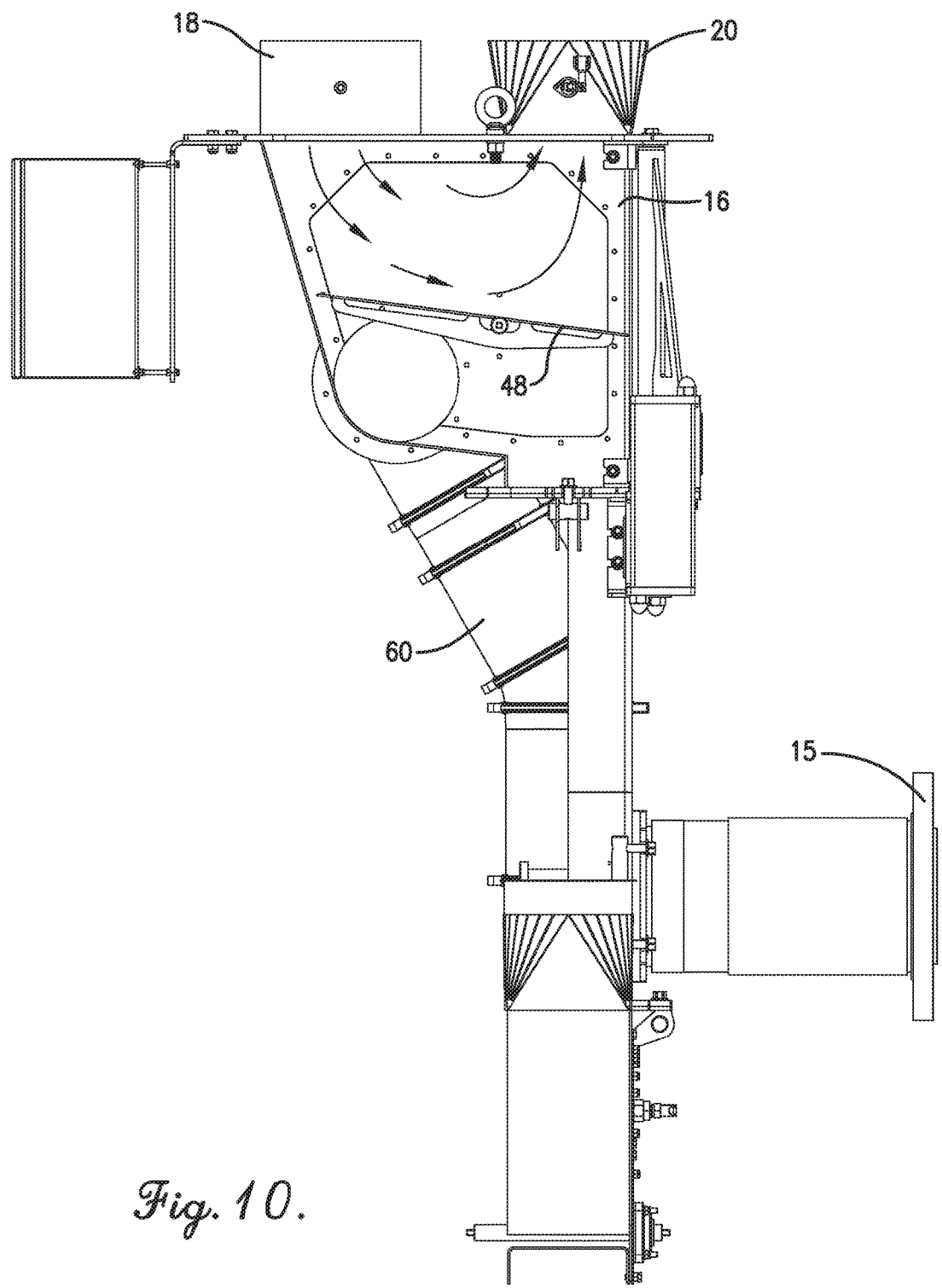
FIG. 10 is a side elevation partial view of the extruder hood from FIG. 5 in the non-steady-state configuration.

The bypass damper 16 may further include two openings positioned on each of its lateral sides (one of such openings illustrated in FIGS. 4, 5, and 9-10), which are configured to fluidly connect the bypass damper 16 with components of the distribution header 22, as will be described in more detail below. With reference to FIGS. 4, 5, and 9-10, the bypass damper 16 may also include a diverter valve 48 that is configured to selectively transition from a steady-state configuration to a non-steady-state configuration. The diverter valve 48 may comprise a rectangular plate and/or a blade-like element that is configured to rotate within the interior space of the bypass damper 16. In the steady-state configuration, as illustrated in FIGS. 4 and 9, the diverter valve 48 may be positioned generally vertically so as to direct conditioned air received in the primary air inlet 18, via the sanitary blower 32, through the openings connected to the distribution header 22. In such a steady-state configuration, the diverter valve 48 is also operable to block air from being directed from the primary air inlet 18 directly to the primary outlet 20 and into the convey line 38. In the non-steady-state configuration, as illustrated in FIGS. 5 and 10, the diverter valve 48 is positioned generally horizontally so as to direct conditioned air received in the primary air inlet 18, via the sanitary blower 32, directly to the primary outlet 20 where it exits the extruder hood 10 into the convey line 38. In such a non-steady-state configuration, the diverter valve 48 is also configured to block air from being directed from the primary air inlet 18 through the openings to the distribution header 22.

In some embodiments, the diverter valve 48 may be pneumatically operated, such as by a pneumatic actuator 50, as is illustrated in FIG. 3. The pneumatic actuator 50 may be operated via an electro-mechanical pneumatic solenoid contained in a junction box 52, such as illustrated in FIGS. 1-3. In some embodiments, the junction box 52 may be connected to a main control station, electrical supply, pneumatic supply, and the like, for controlling and for powering the extruder hood 10. The main control station (not shown) may include various control mechanisms, such as mechanical buttons, levers, touchscreen display interfaces, or the like, for controlling the extruder hood 10 and/or the extruder machine 15. However, in other embodiments, the junction box 52 may be fitted with such control mechanisms for controlling the extruder hood 10 and/or extruder machine 15. In some embodiments, the diverter valve 48 may also be associated with a limit switch 54, as shown in FIG. 1, which can display (e.g., via mechanical indicators, indicator lights, etc.) the position of the diverter valve 48 (i.e., either in the steady-state or non-steady-state configuration). In some other embodiments, the limit switch 54 may be connected with a graphic display, such as may be included with the junction box 52, for displaying the position of the diverter valve 48. In alternative embodiments, the diverter valve 48 may be mechanically operated, such as by a mechanical switch, lever, or the like, which can transition the diverter valve 48 between the steady-state and non-steady-state configurations.

Turning now to the distribution header 22 in more detail, and with reference to FIGS. 1-7, the distribution header 22 may comprise first and second distribution arms 60, 62 fluidly connected to a diffuser plenum 64. The distribution arms 60, 62 may comprise conduits or ducts that are configured to fluidly connect the bypass damper 16 (i.e., at the openings on the lateral sides of the bypass damper 16) with the diffuser plenum 64, so as to cause air to be transmitted to the diffuser plenum 64 from the sanitary blower 32 (via the inlet 18 of the bypass damper 16) when the diverter valve 48 is in the steady-state configuration. In some embodiments, the distribution arms 60, 62 will be formed from aluminum, stainless steel, plastic, fabricated rubber, or the like. The distribution arms 60, 62 may be sized appropriately as required for providing specific volumes of air to the diffuser plenum 64 and, thereafter, across the extruder discharge zone 14. For example, the distribution arms 60, 62 may each have a diameter of between 2 to 16 inches, between 4 to 12 inches, between 6 to 10 inches, or about 8 inches. Beneficially, the first and second distribution arms 60, 62 provide for the airflow from the sanitary blower 32 to follow two paths to the diffuser plenum 64, such that the airflow from the sanitary blower 32 is approximately split in half, with one-half flowing through each of the distribution arms 60, 62. As a result, the individual distribution arms 60, 62 of embodiments of the present invention can be formed in a generally smaller and more manageable size than can be achieved with a single airflow conduit. Furthermore, splitting the airflow provides twice the resolution to evenly distribute air across the extruder discharge zone 14, such that a laminar airflow is created.

In more detail, as illustrated in FIGS. 4-7, the diffuser plenum 64 may comprise a housing defining an interior space. In some embodiments, the diffuser plenum 64 may be formed from aluminum, stainless steel, plastic, or other material with sufficient strength and durability to function in the pneumatic conveyance system 30 of embodiments of the present invention. The diffuser plenum 64 may be secured to the lower portion of the main hood body 12, such that the interior space of the diffuser plenum 64 may be fluidly connected with the interior space of the main hood body 12. The distribution header 22 may be secured to the lower end of the main hood body 12 by various forms of attachment, such as by flanged portions of each of the diffuser plenum 64 and the main hood body 12 being secured together via threaded fasteners, as shown in the drawings. In some embodiments, gaskets may not be required to facilitate the connection between the distribution header 22 and the main hood body 12. As will be described in more detail below, interior surfaces of the diffuser plenum 64 may be specifically configured with aerodynamic contours that, in conjunction with the distribution arms 60, 62, create preferential flow channels capable of efficiently directing airflow through the diffuser plenum 64 and across the extruder discharge zone 14 such that the extruded material can be efficiently removed and discharged from the extruder hood 10, via the primary outlet 20, and into the convey line 38.

Figure 6:
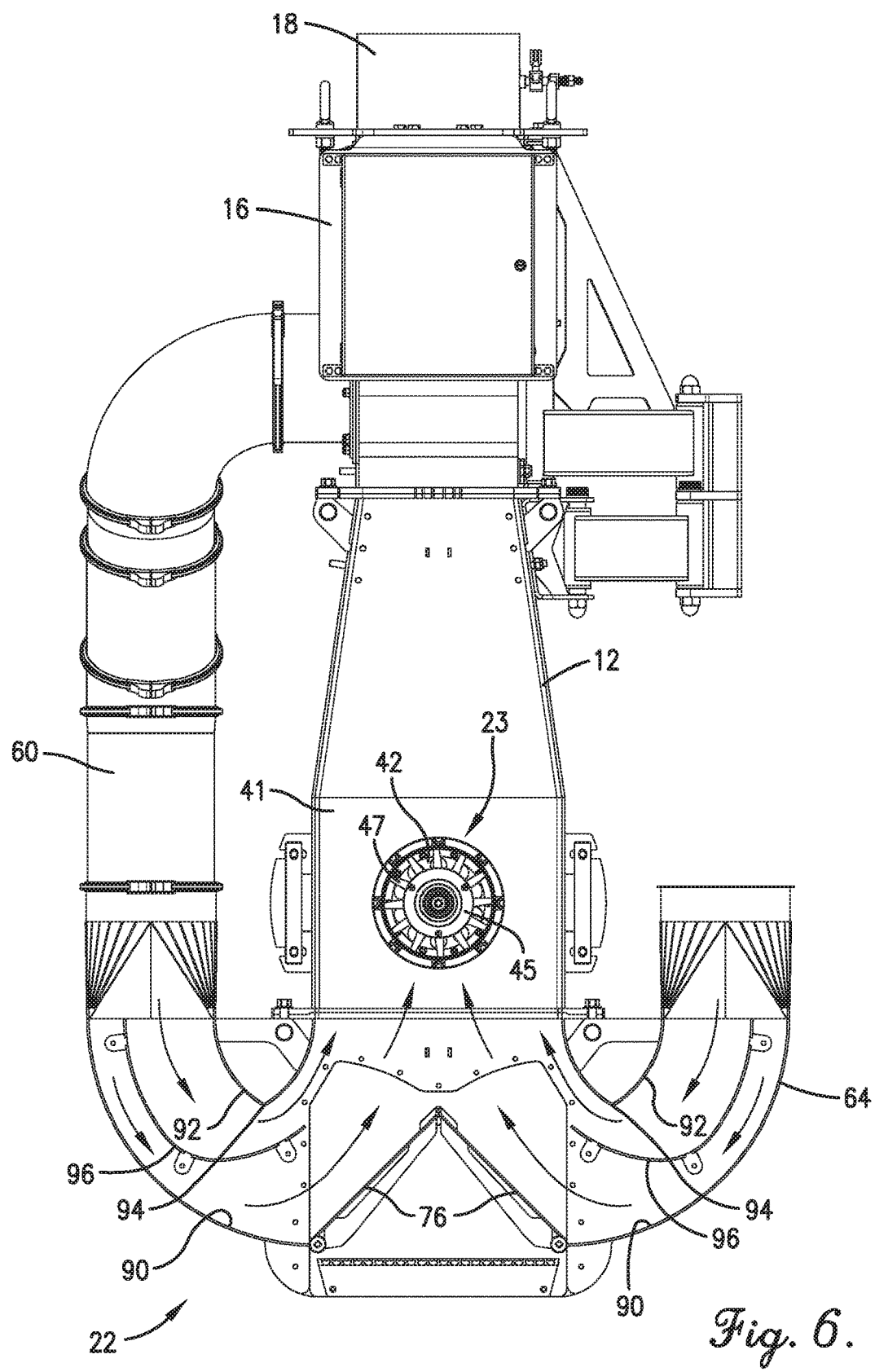
FIG. 6 is a front elevation partial view of the extruder hood from FIG. 4 in the steady-state configuration.
Figure 7:
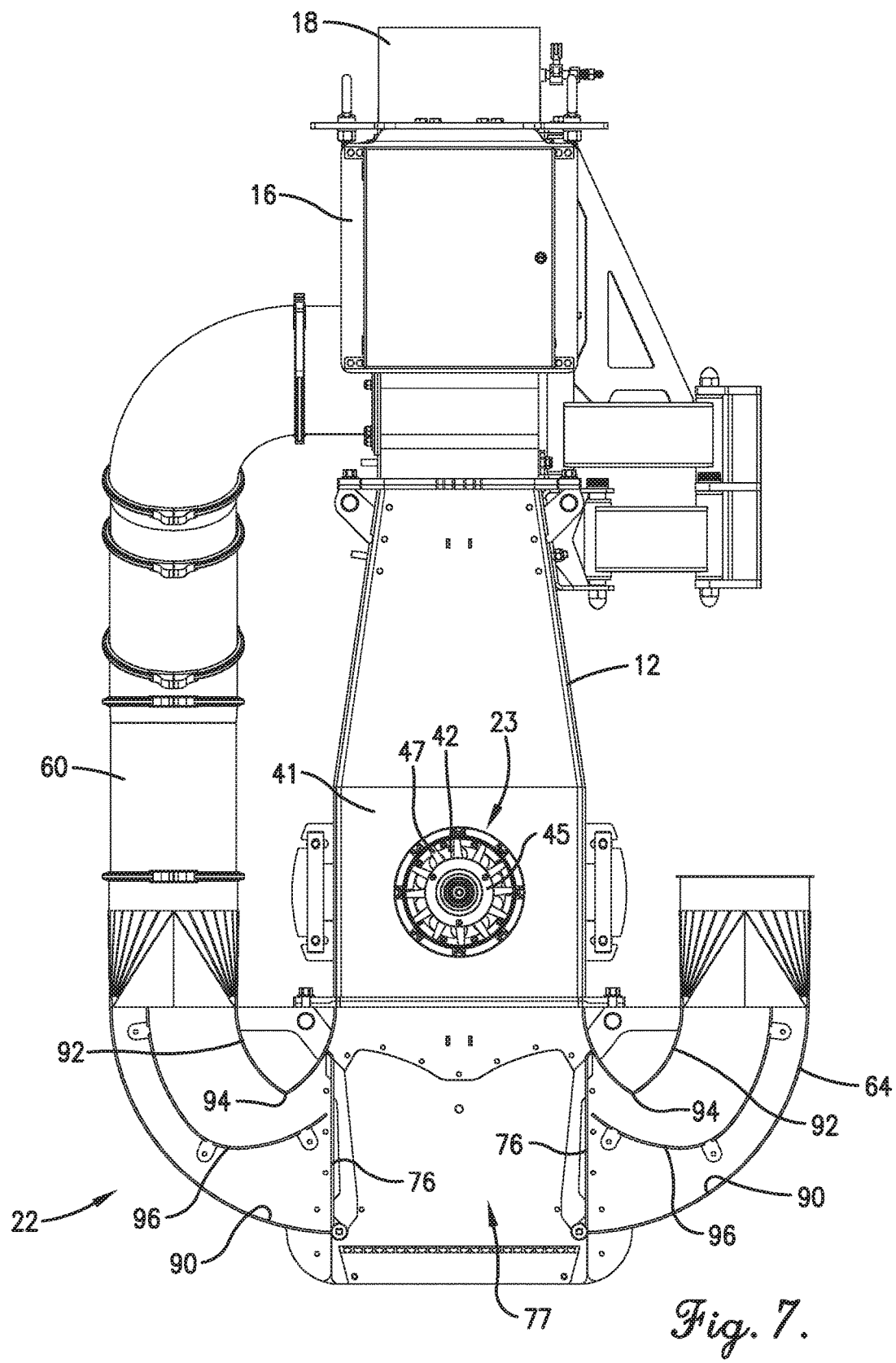
FIG. 7 is a front elevation partial view of the extruder hood from FIG. 5 in the non-steady-state configuration.

In some embodiments, as illustrated in FIGS. 4-7, the diffuser plenum 64 will include two drop-out gates 76 pivotally secured to a bottom of the diffuser plenum 64. In the steady-state configuration, the drop-out gates 76 will be closed (FIGS. 4 and 6) so as to form a generally continuous portion of a bottom interior surface of the diffuser plenum 64, thereby creating at least a portion of the above-stated preferential flow channels. In the non-steady-state configuration, the drop-out gates 76 will be open (FIGS. 5 and 7), such that they are rotated upward about their pivot connection so as to block the air paths through the diffuser plenum 64 from each of the first and second distribution arms 60, 62. In such a position, the open drop-out gates 76 present a waste discharge opening 77 at the bottom of diffuser plenum 64, as illustrated in FIGS. 5 and 7, which provides a path through which waste material extruded from the die set 42 can be removed from the extruder hood 10.

In some embodiments, the drop-out gates 76 may be pneumatically operated, such as by pneumatic actuator 80, as is illustrated in FIGS. 1 and 3. The pneumatic actuator 80 may be operated via an electro-mechanical pneumatic solenoid contained in the junction box 52. In some embodiments, the drop-out gates 76 may also be associated with a limit switch 82, which can display (e.g., via mechanical indicators, indicator lights, etc.) the position of the drop-out gates 76 (i.e., either in the steady-state or non-steady-state configuration). In some other embodiments, the limit switch 82 may be connected with a graphic display associated with the junction box 52, so as to further display the position of the drop-out gates 76. In alternative embodiments, the drop-out gates 76 may be mechanically operated, such as by a mechanical switch, lever, or the like, which can transition the drop-out gates 76 between the steady-state and non-steady-state configurations.

Turning to the preferential flow channels of the diffuser plenum 64 in more detail, as illustrated in FIGS. 4-7, as the two airflows from the first and second distribution arms 60, 62 are rejoined in the diffuser plenum 64, the preferential flow channels are configured such that reverse direction interference (e.g., turbulence) of the impacting airflows is minimized. In a typical single conduit or duct, if an airflow traveling at typical velocities (e.g., 3000-6000 feet per minute) is turned sharply, the air will concentrate itself toward the outer circumference of the turn and will require distance to redistribute itself appropriately. Contrastingly, the preferential flow channels of embodiments of the present invention reduce turbulence and, thus, provide for a laminar airflow to be created and directed across the extruder discharge zone 14.

In more detail, the size and design of the distribution arms 60, 62 bringing the conditioned air down to the diffuser plenum 64 in conjunction with the airflow volume and the aerodynamic contours of the diffuser plenum 64 determine how effectively the airflow is delivered to the extruder discharge zone 14. In embodiments of the present invention, the interior surfaces of the diffuser plenum 64 are aerodynamically optimized to create preferential flow channels that control how the air expands into the interior space of the main hood body 12, including across the extruder discharge zone 14. As illustrated in FIGS. 4-7, the preferential flow channels are formed by creating an arcuate flow-path that extends from each of the distribution arms 60, 62 to the main hood body 12. The arcuate flow-paths presented by the diffuser plenum 64 divert the airflow approximately 180 degrees from the downward direction within the distribution arms 60, 62 to the upward direction within the main hood body 12.

Furthermore, a bottom interior surface 90 of each side of the diffuser plenum 64 may be formed with a gradual curvilinear shape so as to direct the airflow from the distribution arms 60, 62 up into the main hood body 12. It is understood that in the steady-state configuration, the drop-out gates 76 form part of the bottom interior surfaces 90 of the diffuser plenum 64. Similarly, a top interior surface 92 of each side of the diffuser plenum 64 is formed with a curvilinear shape so as to direct the airflow from the distribution arms 60, 62 up into the main hood body 12. In addition, however, each of the top interior surfaces 92 include a baffle 94 in the form of corner element. The baffles 94 are configured to partially deflect the airflow travelling through the diffuser plenum 64, such that as the airflow enters the main hood body 12, the airflow is dispersed more evenly across an interior of the main hood body 12. As such, turbulence can be reduced and the airflow provided across the extruder discharge zone 14 is more evenly dispersed. Furthermore, in some embodiments, the diffuser plenum 64 will include a diffuser vane 96 positioned between the top and bottom interior surfaces 90, 92 on each of the sides of the diffuser plenum 64. The diffuser vanes 96 may be formed with a curvilinear shape so as to split the airflow from each of the distribution arms 60, 62 and to more evenly direct such airflow up into the main hood body 12. Specifically, the diffuser vanes 96 are configured to diffuse the airflows uniformly, so as to more evenly disperse the airflow across the extruder discharge zone 14

Given the preferential flow channels defined by the diffuser plenum 64, the amount of air necessary to effectively remove material being extruded through the die set 42 can be minimized. Specifically, a more even airflow across the extruder discharge zone 14 can be created so as to reduce and/or eliminate low airflow areas where extruded material can escape. As such, the required airflow volume within the extruder hood 10 can be reduced. FIGS. 6 and 9-10 illustrates exemplary airflow profiles and patterns that can be realized using the extruder hood 10 of embodiments of the present invention.

In operation, each of the components of the pneumatic conveyance system 30 and/or of the extruder machine 15 is activated so as to be made operational. In more detail, the sanitary blower 32 is activated so as to begin to provide conditioned air to the extruder hood 10 via the primary air inlet 18 of the bypass damper 16. As previously described, the conditioned air may be conditioned so as to provide a filtered, temperature controlled, humidity controlled, and/or sanitized flow of air into the extruder hood 10. In addition, the negative air pump 34 is activated so as to generate a negative pressure in the convey line 38 so as to pull air from the extruder hood 10 via the primary outlet 20 of the bypass damper 16. Furthermore, the extruder machine 15, (as well as the motor associated with the cutting assembly 45) may be activated so as to provide for the extrusion of extruded material from the die set 42.

When the components of the pneumatic conveyance system 30 and the extruder machine 15 are initially made operational, it may take a certain amount of time for each of the components to become fully functional for purposes of forming extruded material and for efficiently removing the extruded material from the extruder hood 10. Such a certain amount of time is herein defined as a "start-up time." During the start-up time, extruded material may not be formed according to specific production requirements. For instance, during the start-up time, the extruder machine 15 may not extrude the appropriate amount of extruded material. Alternatively, the sanitary blower 32 and/or the negative air pump 34 may not be fully functional, such that extruded material is not properly extracted from the extruder hood 10. To alleviate such issues associated with the start-up time, the extruder hood 10 may initially be configured in the non-steady-state configuration, such that the extruded material is not immediately distributed to the convey line 38 for further processing.

As previously described, in non-steady-state configuration, the diverter valve 48 is positioned so as to block air supplied by the sanitary blower 32 from entering into the distribution arms 60, 62 of the distribution header 22. Instead, the diverter valve 48 will direct the air from the sanitary blower 32 directly into the primary outlet 20 of the bypass damper 16 and into the convey line 38. At the same time, the drop-out gates 76 are positioned in the non-steady-state configuration (i.e., the open position) so as to block any air from traveling through the diffuser plenum 64 and through the main hood body 12. Additionally, in the non-steady-state configuration, the drop-out gates 76 create the waste discharge opening 77 at the bottom of the diffuser plenum 64. In such a non-steady-state configuration, the extruded material exits the die set 42 and is cut with the cutting assembly 45. However, because no air is flowing through main hood body 12, the extruded material will simply fall down through the waste discharge opening 77 and out of the extruder hood 10 under the force of gravity.

Contrastingly, once the components of the pneumatic conveyance system 30 and/or the extruder machine 15 have reached their operational conditions, the extruder hood 10 can be transitioned to the steady-state configuration. As previously described, in steady-state configuration, the diverter valve 48 is positioned so as to block air supplied by the sanitary blower 32 from flowing directly through the primary outlet 20 and into the convey line 38. Instead, the diverter valve 48 directs the air from the sanitary blower 32 directly into the distribution arms 60, 62 of the distribution header 22, such that the air is split into two streams. At the same time, the drop-out gates 76 are positioned in the steady-state configuration (i.e., the closed position) so as to form part of the preferential flow channels in the diffuser plenum 64. As such, the airflow is directed from the first and second distribution arms 60, 62 through the preferential flow channels of the diffuser plenum 64 and up into the main hood body 12 where it flows across the extruder discharge zone 14 in an even manner. The airflow across the extruder discharge zone 14 forces the extruded material up through the main hood body 12 into the bypass damper 16, out the primary outlet 20, and into the convey line 38 for further process (such as drying).

It should also be understood that the extruder hood 10 can be transitioned from the steady-state to the non-steady-state configurations when operational problems are encountered, for regular maintenance or cleaning, for product changeover, or the like. For instance, if a problem with the extruder machine 15 is encountered, the extruder hood 10 can be transitioned from the steady-state to the non-steady-state configurations, such that airflows are blocked from flowing across the extruder discharge zone 14 and any extruded material can fall through the waste discharge opening 77 of the diffuser plenum 64. As such, the extruded material can easily be obtained for testing to ensure its composition meets production requirements. The non-steady-state configuration of the extruder hood 10 can be maintained until the maintenance or repairs are performed on the extruder hood 10, or until the problem with the extruder machine 15 is otherwise resolved. Beneficially, the cutting assembly 45 and die set 42 can remain attached to the extruder hood 10 (and/or contained within the interior space of the main hood body 12) so as to increase safety during maintenance or repairs. Similarly, if a different type of extruded material is required to be produced, the extruder hood 10 can be transitioned from the steady-state to the non-steady-state configurations for purposes of changing the die sets 42 and/or cutting assemblies 45. In some embodiments, the entire pneumatic conveyance system 30 may need to be deactivated to access the interior of the extruder hood 10, such as to change the die sets 42 and/or the cutting assemblies 45. Regardless, once the required maintenance, cleaning, or product changeover has been completed, the extruder hood 10 can be transitioned back the steady-state configuration where extruded material can be efficiently formed and transported to the convey line 38.

The extruder hood 10 described above provides several advantages over extruder systems currently in use. For instance, the extruder hood 10 of embodiments of the present invention can be formed without use of gaskets or other components used to fluidly seal sections of the extruder hood 10. In particular, the pneumatic conveyance system 30 is configured such that a zero point "Z" is located in the convey line 38 between the extruder hood 10 and the negative air pump 34. As used herein, the term zero point is defined as the location at which the air-pressure inside the pneumatic conveyance system 30 changes from a value higher than an ambient air-pressure to a value lower than the ambient air-pressure. The position of the zero point is determined by properly balancing the airflows created by each of the sanitary blower 32 and the negative air pump 34. Beneficially, by causing the zero point to be positioned along the convey line 38, the extruder hood 10 is generally maintained at a pressure that is higher than the ambient air-pressure. As such, portions of the extruder hood 10 that are not completely sealed will not have a negative impact on extrusion operations. In more detail, because of the positive air-pressure within the extruder hood 10, only the conditioned air from inside the extruder hood 10 will pass through any such unsealed portions (i.e., from inside the extruder hood 10 to outside the extruder hood 10). No ambient air, which is not conditioned (i.e., non-filtered, non-temperature controlled, non-humidity controlled, non-filtered, etc.), will be allowed to enter the extruder hood 10 from the unsealed portions. As such, the sanitary integrity of the extruder hood 10 can be maintained. Additionally, because gaskets are not required to be used, the chance of gasket degradation and contamination from gasket particles into the extruded material is eliminated. Furthermore, the overall complexity and cost of the extruder hood 10 is reduced.

In addition, the monolithic design of the main hood body 12 provides several benefits over previously-used extruder hoods that incorporated a clamshell design (i.e., a design in which the extruder hood is split horizontally or vertically). Specifically, the monolithic design of the main hood body 12 can simplify the complexity of the extruder hood 10, which reduces cost, alleviates the need for gaskets, and enhances sanitary and hygienic compliance. With respect to sanitary and hygienic compliance, the monolithic design of the main hood body 12 facilitates efficient dismantling of the extruder hood 10 for cleaning procedures and, further, supports clean-in-place procedures. For example, the generally planar major panels 44, 41 facilitate the integration of the main hood body 12 with the cutter adapter 46 and the die adapter 43, respectively. As mentioned above, the cutter adapter 46 and the die adapter 43 allow for a quick connection and disconnection of the cutting assemblies 45 and the die sets 42 for start-up, shut-down, re-tooling, maintenance, cleaning, troubleshooting or the like. Furthermore, the cutter adapter 46 and the die adapter 43 of embodiments of the present invention allow for the cutting assemblies 45 and the die sets 42 to be connected in proper alignment with the main hood body 12 and in a manner that provides a particle-tight seal with the main hood body 12.

Figure 11:
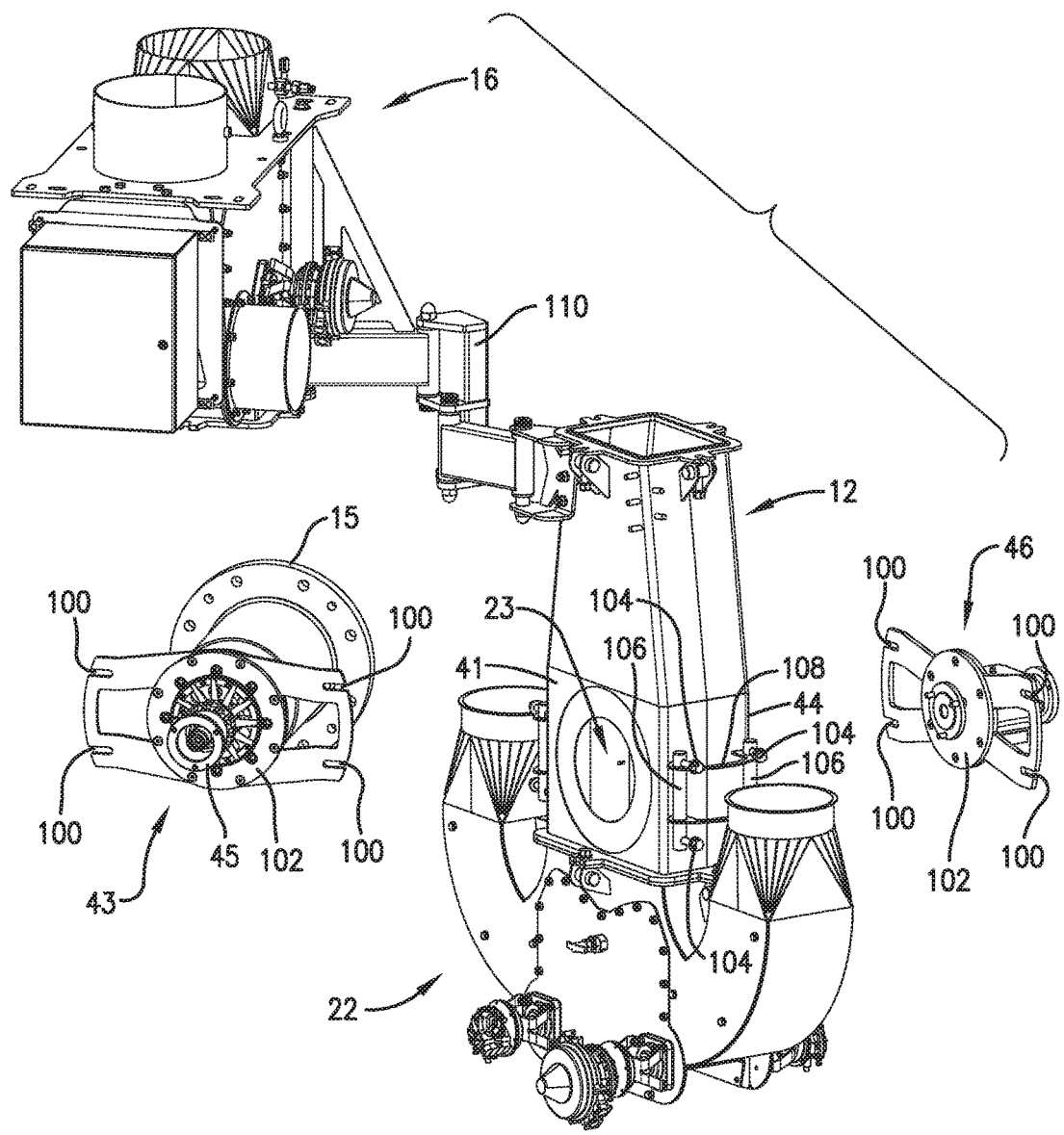
FIG. 11 is a front perspective partially-exploded view the extruder hood from FIGS. 1-3, with a main hood body of the extruder hood being swung away from a bypass damper of the extruder hood via an articulating davit arm.
Figure 12:
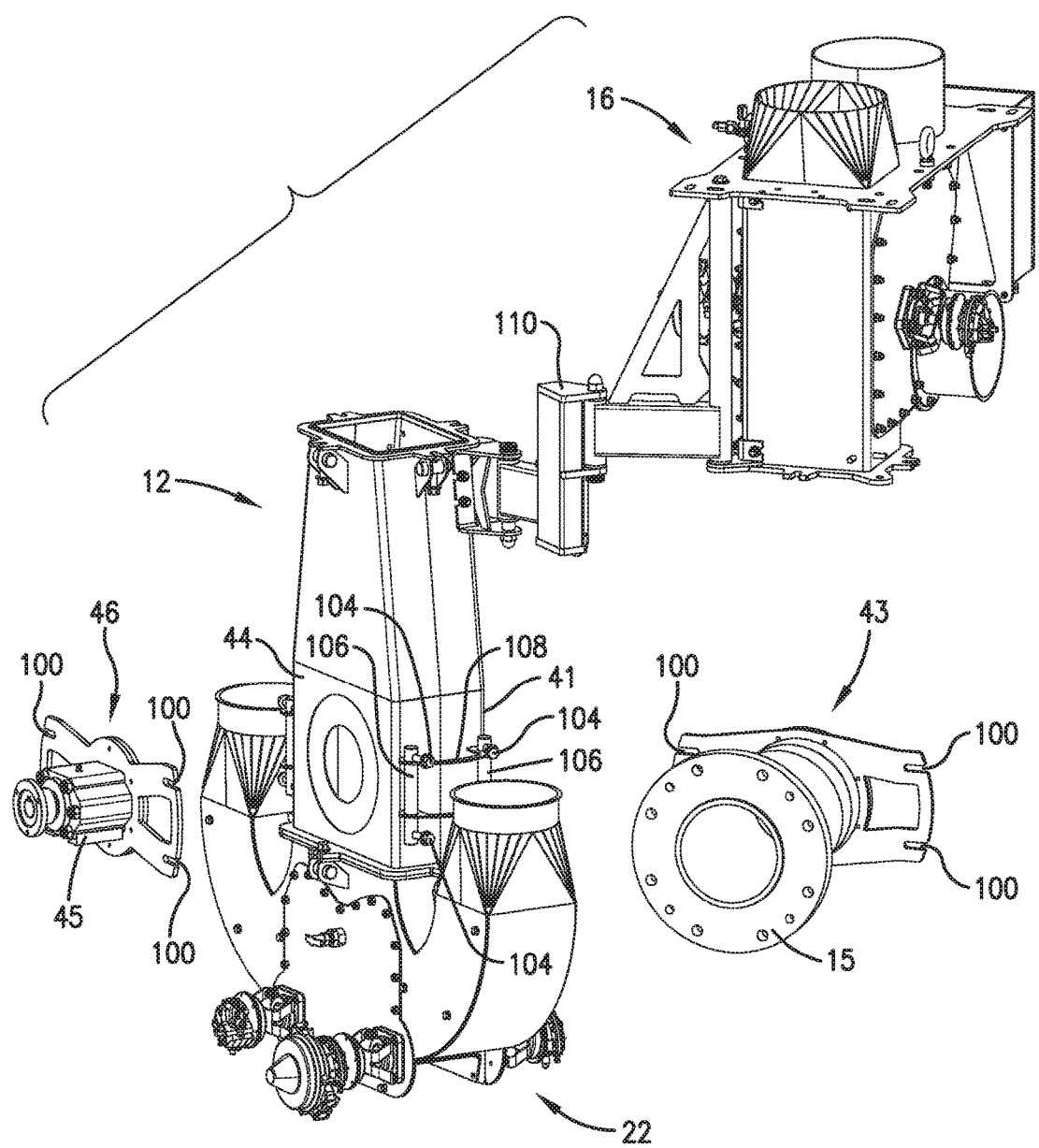
FIG. 12 is a rear perspective partially-exploded view of the extruder hood from FIG. 11.

In more detail, embodiments provide for the cutter adapter 46 and the die adapter 43 are to be connected to the main hood body 12 in a secure and sealed manner. With reference to FIGS. 11 and 12, the cutter adapter 46 and the die adapter 43 may each be formed as a generally rectangular mounting unit with lateral side portions that include fastener receiving notches 100. The cutter adapter 46 and the die adapter 43 may each additionally include an annular sealing surface 102 (See FIG. 11) that is configured to seal against the exterior portions of the major panels 44, 41, respectively. In some embodiments, the annular sealing surfaces 102 may be formed from a high-temperature polymer, so as to maintain an appropriate seal with the main hood body 12 without damaging the main hood body 12. Because of the radial thickness of the annular sealing surfaces 102, the cutter adapter 46 and the die adapter 43 can be sealingly engaged with the main hood body even if the cutter adapter 46 and the die adapter 43 are misaligned with the axes of the openings formed on the major panels 44, 41 (e.g., opening 23 on major panel 41).

To engage the cutter adapter 46 and the die adapter 43 to the main hood body, the cutter adapter 46 and the die adapter 43 may be positioned (or the main hood body 12 may be positioned, as discussed in more detail below) such that the cutter adapter 46 and the die adapter 43 are generally aligned with the openings on the major panels 44, 41, respectively. Nevertheless, as noted above, precise alignment may not be required. In some embodiments, the die adapter 43 may first be engaged with the main hood body 12. To accomplish such engagement, the sealing surface 102 may be placed in contact with the major panel 41, and fasteners 104 on the main hood body 12 may be engaged within the receiving notches 100 on the die adapter 43. The fasteners 104 may be rigidly connected to rotating rods 106 that are secured to the lateral sides of the main hood body 12 via side brackets 108.

The side brackets 108 may be rigidly secured to the main hood body 12, such as via weld. The rotating rods 106 may be configured to translate vertically, so as to provide for a vertical alignment adjustment for the die adapter 43 when it is secured to the main hood body 12 via the fasteners 104. Additionally, the length of the receiving notches 100 of the die adapter 43 are configured to permit lateral movement of the die adapter 43 when the fasteners 104 are received therein. As such, embodiments of the present invention provide for the die adapter 43 to be laterally adjusted in additional to being vertically adjusted. As previously noted, the sealing surface 102 is configured to facilitate a seal with the main hood body 12 even if the die adapter 42 is misaligned with the opening 23 on the major panel 41.

The cutter adapter 46 may be secured to the main hood body 12 in a similar manner as the die adapter 43 (i.e., connection of the fasteners 104 with the receiving notches 100), and may be vertically and horizontally adjustable in the same manner as the die adapter 43. In addition, however, because embodiments of the present invention provide for each of the die adapter 43 and the cutter adapter 46 to be sealingly engaged with the main hood body 12 even when misaligned, embodiments of the present invention may also include the use of "off-axis" cutting arrangements, such as off-axis cutting assemblies. To disengage the die adapter 43 and the cutter adapter 46 from the main hood body 12, the fasteners 104 may be loosened and rotated away from the receiving notches 100. As such, the die adapter 43 and the cutter adapter 46 are free to be disengaged and moved away from the main hood body 12.

In additional embodiments, portions of the extruder hood 10 may be moved or shifted. Specifically, embodiments of the present invention provide for the extruder hood 10 to be formed with a generally small footprint and weight, so as to facilitate such movement. In some embodiments, as illustrated in FIGS. 11-12, the main hood body 12 may be connected to the bypass damper 16 via an articulating davit arm 110. As such, the main hood body is configured to be rotated with respect to the bypass damper 16 and the associated convey lines. In such embodiments, the bypass damper 16 may be rigidly secured in place, such as to other permanently or semi-permanently-positioned components of the pneumatic conveyance system 30. To accomplish such rotation of the main hood body 12, the fasteners connecting the main hood body 12 and the bypass damper 16 should be disconnected. Additionally, the die adapter 43 and the cutter adapter 46 should be disengaged from the main hood body 12. As such, the main hood body 12 is free to be rotated or swung away via the articulating davit arm 110. Such a configuration may be beneficial, for instance, to facilitate maintenance, reconfiguration, and repair of the extruder hood 10. In addition, such a configuration may allow the extruder hood 10 to be used with multiple, side-by-side extruding machines, such that the position of the extruder hood 10 can be easily repositioned for use with a particular extruding machine. Furthermore, in other embodiments, the extruder hood 10 may be mounted on a roller cabinet (not shown), which facilitates maneuverability, transportability, and maintenance of the extruder hood.

Although the invention has been described with reference to the embodiment illustrated in the attached drawing figures, it is noted that equivalents may be employed and substitutions made herein without departing from the scope of the invention as recited in the claims.

The invention claimed is:

1. An extruder hood configured to operate in a steady-state configuration and a non-steady-state configuration, said extruder hood comprising:
   an air inlet;
   an extruder hood outlet;
   an extruder discharge zone within an interior space of said extruder hood, wherein said extruder discharge zone is configured to receive extruded material; and
   a distribution header comprising a pair of distribution arms, wherein said distribution header is configured to selectively receive air from said air inlet and to direct the air across said extruder discharge zone,
   wherein in the steady-state configuration, said extruder hood is configured to direct air received from said air inlet through said pair of distribution arms and across said extruder discharge zone to cause extruded material to be ejected from said extruder hood via said extruder hood outlet,
   wherein in the non-steady-state configuration, said extruder hood is configured to direct air received from said air inlet out of said extruder hood via said extruder outlet without being directed across said extruder discharge zone.

2. The extruder hood according to claim 1, further comprising a bypass damper that includes said air inlet and said extruder hood outlet, and a main hood body that includes said extruder discharge zone, wherein said bypass damper is connected to said main hood body.

3. The extruder hood according to claim 1, wherein said bypass damper is connected to said main hood body without a gasket.

4. The extruder hood according to claim 2, wherein said bypass damper is connected to said main hood body at a first end of said main hood body, such that said bypass damper is configured to be fluidly connected to said first end of said main hood body.

5. The extruder hood according to claim 4, wherein said distribution header is connected to said main hood body at a second end of said main hood body, and wherein said bypass damper is configured to be fluidly connected to said second end of said main hood body via said distribution header.

6. The extruder hood according to claim 5, wherein said distribution header includes at least one of a baffle and a diffuser vane for generating a laminar flow of air across said extruder discharge zone.

7. The extruder hood according to claim 5, wherein said bypass damper includes a rotating diverter valve for selectively diverting air from said air inlet to said distribution header or to said extruder hood outlet.

8. The extruder hood according to claim 7, wherein in said steady-state configuration, said diverter valve diverts air from said air inlet to said distribution header.

9. The extruder hood according to claim 7, wherein in said non-steady-state configuration, said diverter valve diverts air from said air inlet to said extruder hood outlet.

10. An extruder hood configured to operate in a steady-state configuration and a non-steady-state configuration, said extruder hood comprising:
    an air inlet;
    an extruder hood outlet; and
    an extruder discharge zone within an interior space of said extruder hood, wherein said extruder discharge zone is configured to receive extruded material,
    wherein in the steady-state configuration, said extruder hood is configured to direct air received from said air inlet across said extruder discharge zone to cause extruded material to be ejected from said extruder hood via said extruder hood outlet, wherein in the non-steady-state configuration, said extruder hood is configured to direct air received from said air inlet out of said extruder hood via said extruder outlet without being directed across said extruder discharge zone, further comprising a bypass damper that includes said air inlet and said extruder hood outlet, and a main hood body that includes said extruder discharge zone, wherein said bypass damper is connected to said main hood body, wherein said bypass damper is connected to said main hood body at a first end of said main hood body, such that said bypass damper is configured to be fluidly connected to said first end of said main hood body, wherein said extruder hood further includes a distribution header connected to said main hood body at a second end of said main hood body, and wherein said bypass damper is configured to be fluidly connected to said second end of said main hood body via said distribution header, wherein said distribution header includes a pair of rotating drop-out gates for selectively permitting or restricting air to flow from said distribution header to said main hood body.

11. The extruder hood according to claim 10, wherein when said drop-out gates restrict air from flowing from said distribution header to said main hood body, said drop-out gates present a waste opening for allowing extruded material to drop out of said extruder hood.

12. The extruder hood according to claim 10, wherein in said steady-stated configuration, said drop-out gates permit air to flow from said distribution header to said main hood body.

13. The extruder hood according to claim 10, wherein in said non-steady-stated configuration, said drop-out gates restrict air from flowing from said distribution header to said main hood body.

14. A method for operating an extruder hood, said method comprising the steps of:
(a) providing an extruder hood comprising an extruder discharge zone for receiving extruded material, an air inlet for receiving pressurized air, and an extruder hood outlet for removing air and extruded material from the extruder hood,
wherein the extruder hood further comprises a distribution header fluidly connecting the air inlet to the extruder discharge zone, wherein the distribution header includes a pair of drop-out gates for selectively permitting or restricting air to flow from the air inlet to the extruder discharge zone;
(b) configuring the extruder hood in a non-steady-state configuration, wherein pressurized air received in the air inlet is immediately directed out of the extruder hood, via the extruder outlet, without being directed across the extruder discharge zone; and
(c) transitioning the extruder hood to a steady-state configuration, wherein pressurized air received in the air inlet is directed across the extruder discharge zone to cause extruded material to be ejected from the extruder hood via the extruder hood outlet.

15. The method according to claim 14, wherein the extruder hood comprises a bypass damper that includes the air inlet and the extruder hood outlet, wherein the bypass damper further includes a rotating diverter valve for selectively diverting air received in the air inlet to the extruder discharge zone in said steady-state configuration or to the extruder hood outlet in the non-steady-state configuration.

* * * * *